(12) United States Patent
Aoki et al.

(10) Patent No.: US 6,736,452 B2
(45) Date of Patent: May 18, 2004

(54) AIR-CONDITIONING UNIT FOR VEHICLE SEAT

(75) Inventors: Shinji Aoki, Chiryu (JP); Toshifumi Kamiya, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/303,386

(22) Filed: Nov. 25, 2002

(65) Prior Publication Data

US 2003/0102699 A1 Jun. 5, 2003

(30) Foreign Application Priority Data

Nov. 30, 2001 (JP) ........................................ 2001-367058

(51) Int. Cl.[7] ................................................ A47C 7/74
(52) U.S. Cl. ............................ 297/180.13; 297/180.14
(58) Field of Search ..................... 297/188.13, 188.14, 297/180.13, 180.14

(56) References Cited

U.S. PATENT DOCUMENTS 5,385,382 A * 1/1995 Single, II et al. ... 297/180.13 X
5,692,952 A * 12/1997 Chih-Hung ........ 297/180.13 X
5,924,766 A * 7/1999 Esaki et al. ............ 297/180.13
6,003,950 A * 12/1999 Larsson ............. 297/180.13 X
6,059,018 A * 5/2000 Yoshinori et al. ... 297/180.13 X
6,145,925 A   11/2000 Eksin et al. ........... 297/180.14
6,179,706 B1 * 1/2001 Yoshinori et al. ... 297/180.14 X
2002/0057005 A1 * 5/2002 Bergheer et al. ....... 297/180.13
2002/0096915 A1 * 7/2002 Aoki et al. ............ 297/180.13

FOREIGN PATENT DOCUMENTS

EP        411 375 A1 * 6/1991 ............. 297/180.13

* cited by examiner

Primary Examiner—Peter M. Cuomo
Assistant Examiner—Rodney B. White
(74) Attorney, Agent, or Firm—Harness, Dickey & Pierce, PLC

(57) ABSTRACT

In an air-conditioning unit mounted in a vehicle seat, a resilient member is provided adjacent to a rear surface of a cover member that makes contact with a user. A cushion member is provided between the cover member and the resilient member. A blower unit is supported by the resilient member on a side opposite to the cushion member with respect to the resilient member. The blower unit is fixed to the resilient member by interposing the resilient member between a fixing member and a blower case.

21 Claims, 12 Drawing Sheets

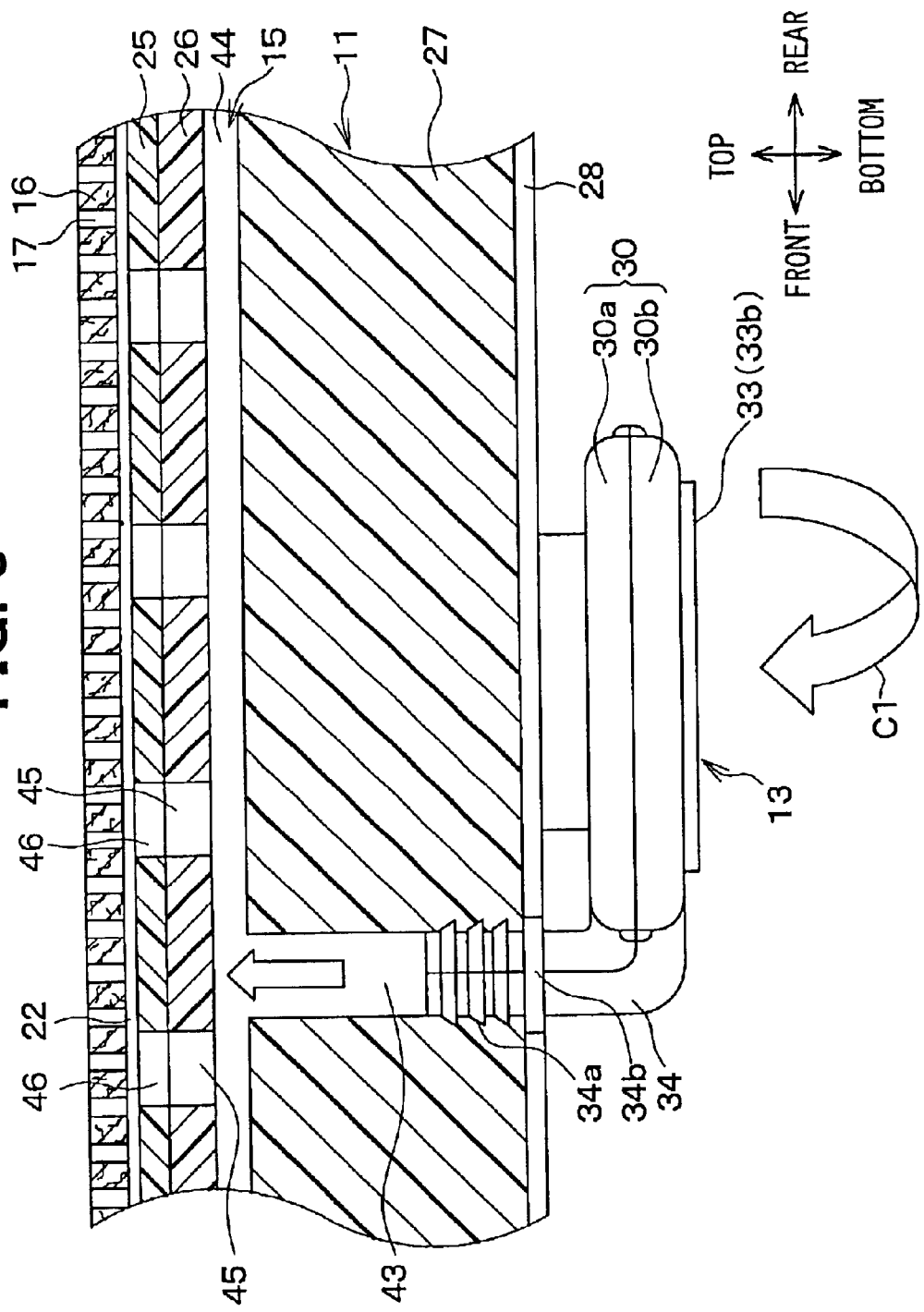

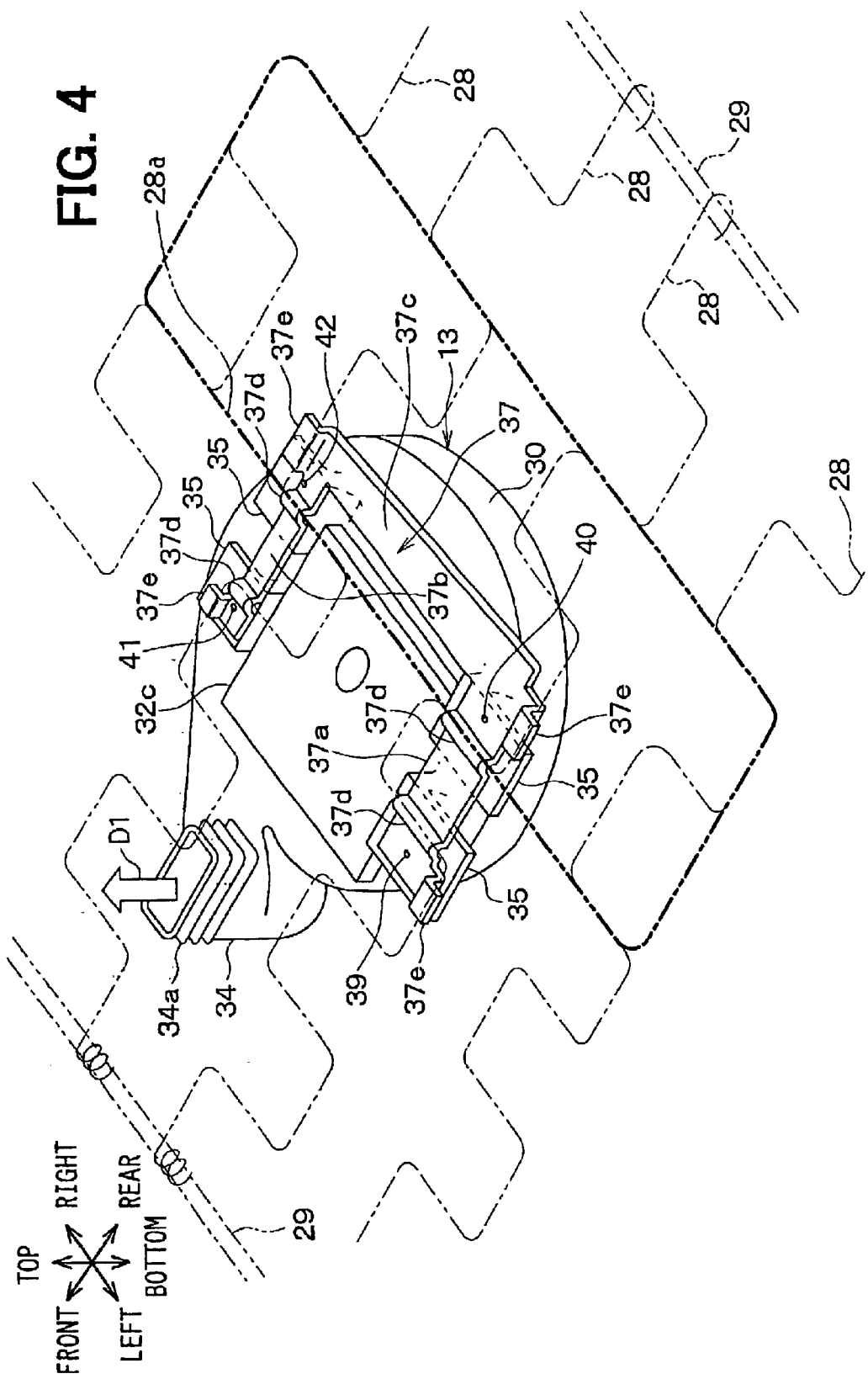

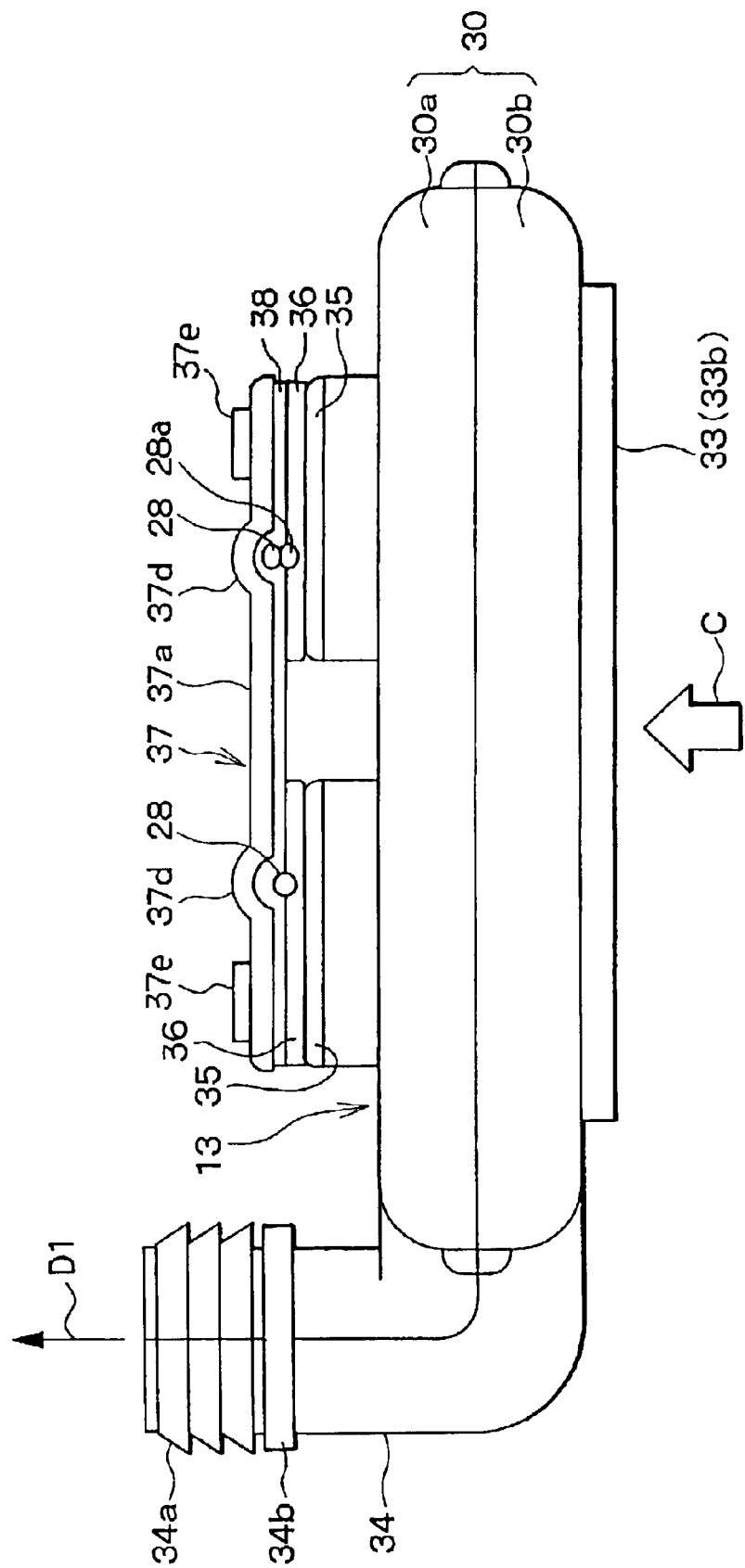

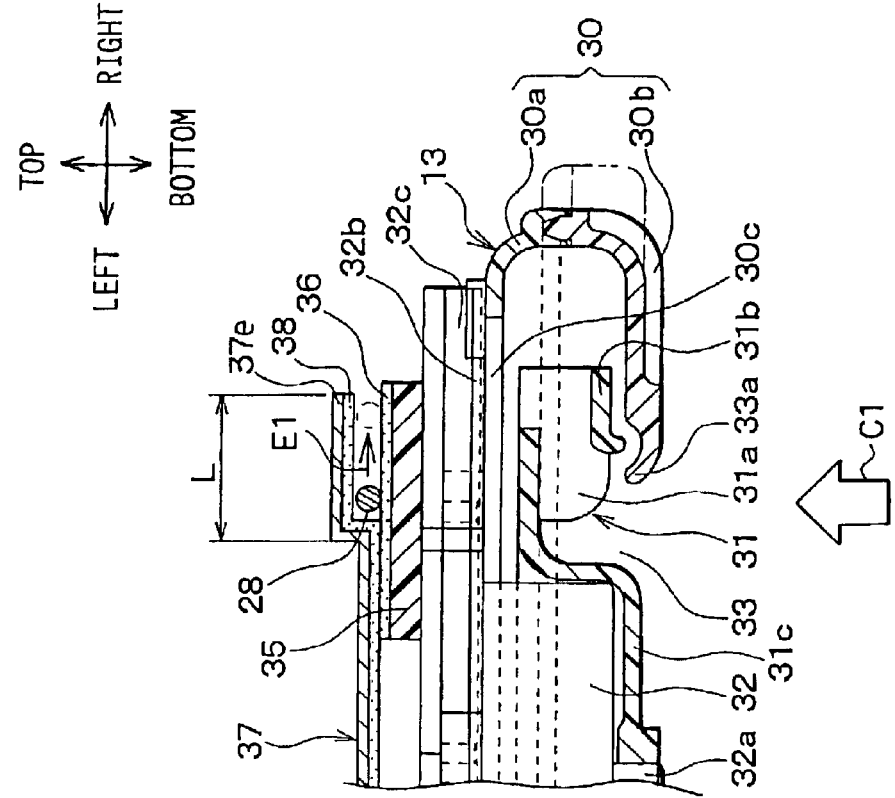
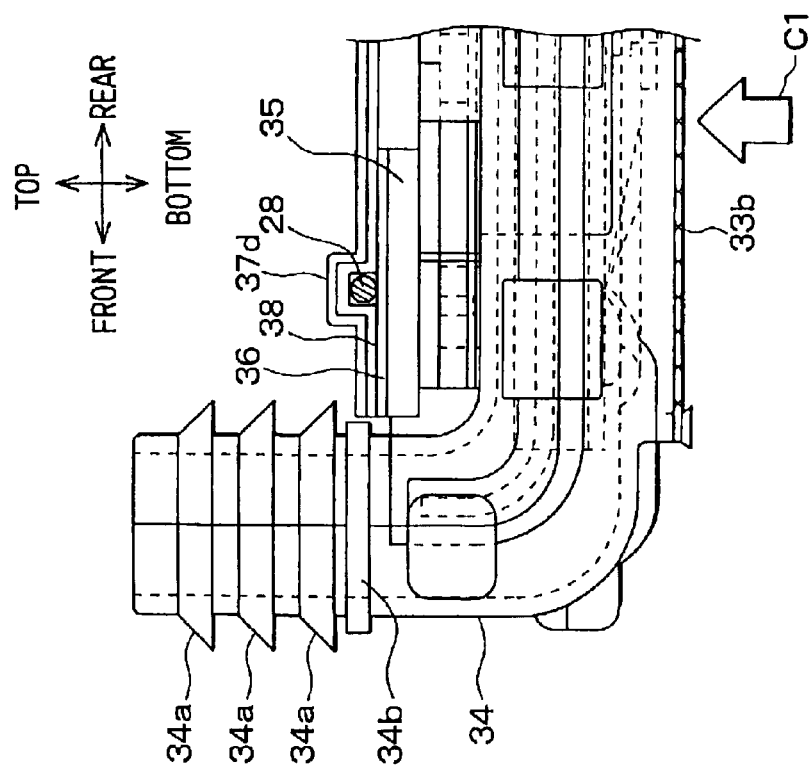
FIG. 6A
FIG. 6B

AIR-CONDITIONING UNIT FOR VEHICLE SEAT

CROSS REFERENCE TO RELATED APPLICATION

This application is based on Japanese Patent Application No. 2001-367058 filed on Nov. 30, 2001, the disclosure of which is incorporated herein by reference.

FIELD OF THE INVENTION

The present invention relates to an air-conditioning unit for a vehicle seat.

BACKGROUND OF THE INVENTION

Various air-conditioning units for vehicle seats are proposed. A blower unit for blowing a conditioned air is generally installed in a cushion member of a seat. For example, in a seat air-conditioning unit disclosed in U.S. Pat. No. 6,145,925, a blower unit is fastened to a seat reinforcement member by an elastic bracket member in a seat cushion member.

Since the blower unit is generally a hard component made of rigid parts, the blower unit fastened to the seat reinforcement member in the cushion member cause discomfort to a user seated on the seat. In addition, the shock due to the user's weight is applied to the blower unit, thereby causing breakage of the blower unit.

In the air-conditioning unit disclosed in U.S. Pat. No. 6,145,925, an air duct, which is a part of the blower unit, is in direct-contact with a cover member that makes contact with the user's body. Therefore, seating comfort is likely to be lessened due to the blower unit. Further, the elastic bracket member for elastically fastening the blower unit to the seat reinforcement member is additionally required. Therefore, the space for mounting the blower unit is enlarged and the cost for mounting the same is increased.

SUMMARY OF THE INVENTION

The present invention is made in view of the above disadvantages, and it is an object of the present invention to improve seating comfort of a vehicle seat having a blower unit therein.

It is another object of the present invention to provide an air-conditioning unit capable of being mounted compactly in a seat.

According to an air-conditioning unit of the present invention, a resilient member is provided adjacent to a rear surface of a cover member of a seat and resiliently supports the seat. A blower case surrounding a blower unit is supported by the resilient member on a side opposite to the cover member with respect to the resilient member.

Since the blower case is supported by the resilient member, the blower unit can move with the resilient member in accordance with pressure applied onto the seat. Further, since the blower case is located on the side opposite to the cover member with respect to the resilient member, discomfort due to the blower case is decreased on the cover member. Therefore, seating comfort is maintained in the seat having the blower unit therein.

Further, the resilient member supports a cushion member of the seat on a side opposite to the cover member with respect to the cushion member. Since the resilient member is also used as a fixing means for fixing the blower unit, a mounting structure of the blower unit is simplified.

BRIEF DESCRIPTION OF THE DRAWINGS

Other objects, features and advantages of the present invention will become more apparent from the following detailed description made with reference to the accompanying drawings, in which:

FIG. 3 is an enlarged, cross-sectional view of a part of the seat cushion illustrating the flow of the air therein, according to the first embodiment of the present invention;

FIG. 4 is a schematic illustration explaining a mounting structure of the blower unit on the seat cushion according to the first embodiment of the present invention;

FIG. 5 is a schematic side view of the blower unit according to the first embodiment of the present invention;

FIG. 6A is a schematic partial side view of the blower unit according to the first embodiment of the present invention;

FIG. 6B is a partial cross-sectional view of the blower unit according to the first embodiment of the present invention;

DETAILED DESCRIPTION OF PREFERRED EMBODIMENT

Preferred embodiments of the present invention will be described hereinafter with reference to the drawings.

[First Embodiment]

Figure 1:
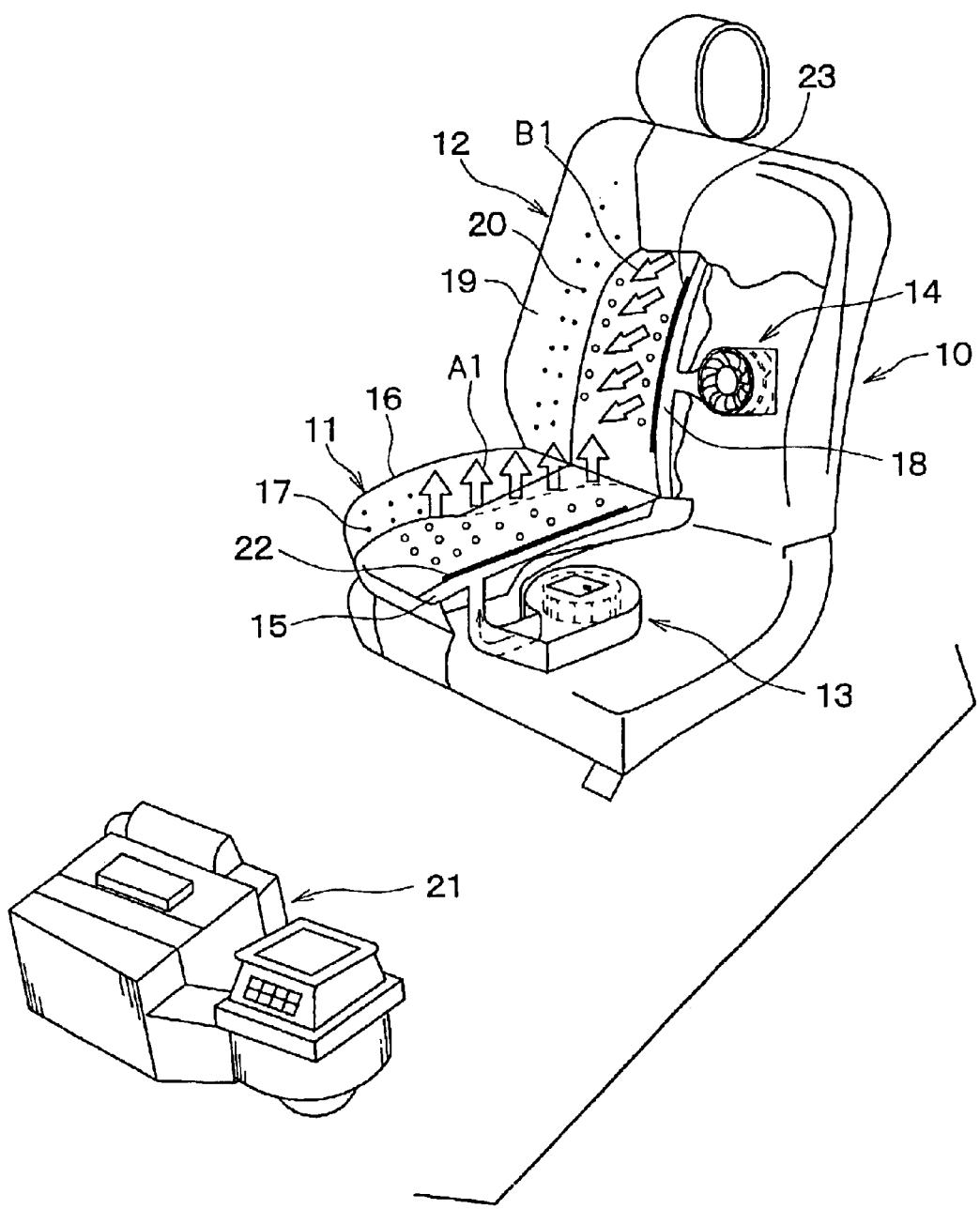
FIG. 1 is a schematic illustration of a vehicle seat and blower units installed therein according to the first embodiment of the present invention.

Referring to FIG. 1, a vehicle seat 10 is used as a driver's seat or an assistant driver's seat. The seat 10 has a seat cushion (seat bottom) 11 for supporting a seat user's hip and a backrest (seat back) 12 for supporting the user's back. A first blower unit 13 is installed in the seat cushion 11. A second blower unit 14 is installed in the backrest 12.

The first blower unit 13 has an air inlet 33 (see FIGS. 5 and 6) at the bottom of the seat cushion 11 and draws air (conditioned air) in a passenger compartment from the air inlet 33. The air drawn from the air inlet 33 is passed through an air passage 15 formed in the seat cushion 11 and blown toward a cover member 16 of the seat cushion 11. The air is blown out toward the user's body through air outlet holes 17 formed on the cover member 16 as shown by arrows A1 in FIG. 1.

Similarly, the second blower unit 14 has an air inlet 75 (see FIG. 11) at the lower part of the backrest 12. The air (conditioned air) in the passenger compartment is drawn into an air passage 18 from the air inlet 75. The air is blown out toward the user's body through the air outlet holes 20 formed on a cover member 19 as shown by arrows B1.

An interior air-conditioning unit 21 is generally installed in an instrument panel in a vehicle front. The passenger compartment is air-conditioned with a conditioned air blown from the air-conditioning unit 21. Therefore, the first and second blower units 13, 14 can draw and blow the conditioned air in the passenger compartment.

The cover members 16, 19 have front surfaces making contact with the user and rear surfaces. Electric heaters 22, 23 are provided adjacent to the rear surfaces of the cover members 16, 19, respectively. The electric heater 22, 23 are made of wire electrical resistors and laid over widely in the seat cushion 11 and backrest 12 in meandering manners.

Figure 2:
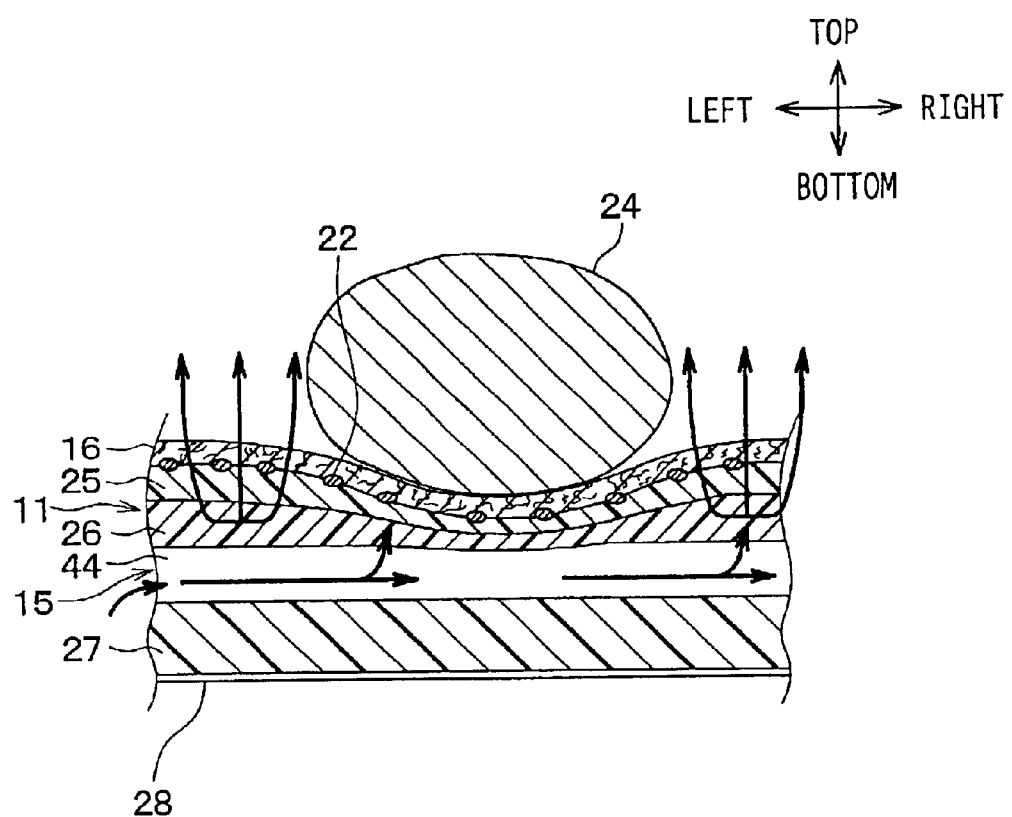
FIG. 2 is a partial cross-sectional view of a seat cushion illustrating a flow of air therein, according to the first embodiment of the present invention.

Next, a mounting structure of the first blower unit 13 in the seat cushion 11 is described referring to FIGS. 2 to 6. Here, front and rear, top and bottom, and right and left directions in figures are actual directions that the seat 10 is mounted on the vehicle. In FIG. 2, seating pressure is applied to the seat cushion 11 in the bottom direction by a user's thigh 24.

As shown in FIG. 2, the seat cushion 11 has cover pad 25, placed pad 26 and cushion member 27. The cover pad 25, placed pad 26 and cushion member 27 are layered adjacent to the rear surface of the cover member 16. The cover member 16 is generally made of leather or fabrics under consideration of a seat design. The cover pad 25, placed pad 26 and cushion member 27 are made of elastically flexible materials. For example, the cover pad 25 and placed pad 26 are made of elastic resin such as closed-cell cellular polyurethane.

The cushion member 27 functions as cushioning of the seat 10. The cushion member 27 has the thickness of about 40 mm, for example, and is thicker than the cover pad 25 and placed pad 26. The cushion member 27 is, for example, made of elastic resin such as open-cell cellular polyurethane. Here, the cover pad 25 can be made of non-woven fabric and the like.

First seat springs (resilient members) 28 are provided under the cushion member 27. The first seat springs 28 are wire-shaped resilient members made of spring steel and having circular cross-sections. The first seat springs 28 extend underneath the cushion member 27 as shown by chain double-dashed lines in FIG. 4. In this embodiment, for example, four seat springs 28 are placed in the front and rear direction. Also, the seat springs 28 are bent into substantially repeated S-shapes.

Further, a second seat spring 28a is provided into a substantially rectangular shape in the substantially middle portion of the cushion member 27 in the front and rear direction, as shown by a thick chain double-dashed line in FIG. 4. Therefore, the first and second 28, 28a are layered in the vertical direction in the rectangular section surrounded with the second seat spring 28a, as shown in FIG. 5. The second seat spring 28a is connected with the first seat springs 28 so that a spring constant (N/cm) of the seat springs 28, 28a is increased in the rectangular section.

Front and rear ends of the first seat springs 28 are connected to and supported by a seat cushion frame 29, as shown in FIG. 4. The seat cushion frame 29 is a metallic rigid body. The seat cushion frame 29 is placed rearward of the cover member 16 into a frame form. The seat cushion frame 29 is a seat reinforcement (structure) member to maintain a shape of the seat cushion 11.

Since the seat springs 28 placed underneath the cushion member 27 are supported by the seat cushion frame 29, the cushion member 27 and the like are supported to move with resiliency of the seat springs 28.

As shown in FIGS. 5 and 6, a blower case 30 of the first blower unit 13 includes a top case 30a and a bottom case 30b both made of resin. The top case 30a and bottom case 30b are joined to each other with screws and the like. The blower case 30 constructs a swirl-shaped scroll casing. A centrifugal blower fan 31 is rotatably installed in the scroll casing.

The centrifugal blower fan 31 includes blades 31a about a center of rotation. Air inlet side portions of the blades 31a, that is, the lower portion in FIG. 6, are connected with an annular shroud 31b. Further, the centrifugal blower fan 31 includes a support plate portion 31c elongated in the radially inward direction of the blades 31a. The blades 31a, shroud 31b and support plate portion 31c are integrally formed of resin. The support plate portion 31c is fixed to a rotary shaft 32a of a drive motor 32 at a central hole, so that the centrifugal blower fan 31 is integrated with the drive motor 32.

The drive motor 32 is a brushless motor. A control circuit substrate 32b of the motor 32 is placed on the top wall of the top case 30a, as shown in FIG. 6B. An opening 30c is formed on the center of the top case 30a. The motor 32 is connected to the control circuit substrate 32b through the opening 30c. A bracket member 32c is layered on the control circuit substrate 32b. The bracket member 32c is made of metal such as aluminum and is formed into a rectangular plate shape. The bracket member 32a is fixed to the top case 30a with a fastening means such as screws, so that the drive motor 32 is fastened to or supported by the top case 30a.

The air inlet 33, which has a circular shape, is formed in the center of the bottom case 30b. The air inlet 33 is open to the space on the floor of the passenger compartment under the seat cushion 11. A bell-mouth portion 33a is formed around the air inlet 33. The bell-mouth portion 33a protrudes toward the shroud 31b, as shown in FIG. 6. A filter 33b is attached to the air inlet 33 to remove dusts around the floor. The filter 33b is, for example, made of a stainless mesh member.

In the present embodiment, the blower case 30 is provided such that the end of the scrolled portion, which defines the air outlet portion, is placed at the front side. An air inflow duct 34 for leading the blown air into the seat is provided to the air outlet portion of the blower case 30. The inflow duct 34 is integrally molded with the top and bottom cases 30a, 30b of resin. The air inflow duct 34 protrudes from the air outlet portion upwardly.

As shown in FIG. 4, the air inflow duct 34 has a substantially rectangular shaped cross-section. Hooks 34a are formed on the outer wall of the upper portion of the inflow duct 34 where protruding upwardly. For example, the hooks 34a are formed in layers. The hooks 34a project outwardly from the outer wall and expands downwardly to prevent disengagement. As shown in FIG. 5, a packing 34b for sealing is attached to the outer wall of the duct 34 under the hooks 34a such as by sticking.

When the centrifugal fan 31 is rotated by the drive motor 32, air around the floor in the passenger compartment is sucked into the blower case 30 through the filter 33b of the air inlet 33 as shown by the arrow C1. The air is blown in the radially outward direction inside the blower case 30 and further blown toward the air inflow duct 34 placed at the air outlet portion. Then, the air is blown upwardly from the air inflow duct 34 as shown by an arrow D1 in FIG. 5.

Fitting seatings 35 are integrally formed of resin with the top case 30a. The seatings 35 are formed to protrude upwardly from the top wall of the top case 30a. As shown in FIG. 4, four seatings 35 are exemplary formed and bent at right angles. Flexible members 36 are attached on the top surfaces of the seatings 35 such as by sticking, as shown in FIGS. 5, 6A and 6B.

A fixing bracket 37 is provided on the four seatings 35. As shown in FIG. 4, the bracket 37 has a substantially U-shape including first bridge portion 37a, second bridge portion 37b and connecting portion 37c. The first and second bridge portions 37a, 37b links between two of seatings 35 in the front and rear direction. The connecting portion 37c connects between the first bridge portion 37a and the second bridge portion 37b.

The bracket 37 is made of metal (ferrous metal) to ensure strength. The bracket 37 is formed into the substantially U-shape by pressing a metallic plate. A flexible member 38 is attached on the lower surface of the bracket 37 such as by sticking. Exemplary, the flexible member 38 of the bracket 37 and the flexible members 36 of the seatings 35 are made of flexible and abrasion resistance materials such as felt of non-woven fabric made of synthetic fibers. The flexible member 36 can be made of rubber, such as acrylonitrile-butadiene rubber (NBR), in place of felt.

The first bridge portion 37a has a pair of first hook portions 37d and a pair of second hook portions 37e. Similarly, the second bridge portion 37b has a pair of first hook portions 37d and a pair of second hook portions 37e. The first hook portions 37d protrude upwardly from the bracket 37 into a semi-cylindrical shape. Portions of the seat springs 28 extending in the right and left direction resides in the first hook portions 37d. Therefore, the seat springs 28 are hooked in the semi-cylindrical-shaped hook portions (recessions) 37d in a manner that forward and backward movements are restricted.

The second hook portions 37e are continuous from the right and left edges of the first and second bridge portions 37a, 37b and bent upwardly and further bent in the horizontal direction to project outwardly in the right and left direction. The seat springs 28 extending in the front and back direction reside in the second hook portions 37e. In FIG. 6B, the seat spring 28 is illustrated at a position (free position) where the seating pressure of the user is not applied onto the seat cushion 11. When the seating pressure is applied onto the seat cushion 11 and the seat spring 28 is displaced downwardly, the seat spring moves outwardly in the right and left direction as shown by an arrow E1. Since the second hook portions 37e are extended in the right and left direction at the distance L, the second hook portions 37e can hold the seat springs 28 while permitting the displacement of the seat springs 28 in the right and left direction.

The bracket 37 is fixed on the seatings 35 at fixing portions 39 to 42 with screws such that the seat springs 28, 28a are sandwiched between the flexible members 36, 38, as shown in FIGS. 4 and 5.

With this, the first blower unit 13 is held by the seat springs 28 on a side opposite to the cushion member 27 with respect to the seat springs 28. Here, the first blower unit 13 is hung from the seat springs 28 under the seat member 27. The flexible members 36, 38 absorb warping of the seat springs 28 and restrict vibration of the first blower unit 13.

Next, a communication structure of the air inflow duct 34 and the air passage 15 in the seat 11 is described with reference to FIGS. 2 and 3. The cushion member 27 has a through hole 43 penetrating in the top and bottom direction, at a location substantially middle in the right and left direction of the seat cushion 11 and a slightly forward from the middle in the front and rear direction.

The inflow duct 34 is press-fit in the through hole 43 at the hook portions 34a, so air leaks between the duct 34 and through hole 43 are suppressed. Also, the inflow duct 34 is firmly fixed to the cushion member 27 with the hook portions 34a. Further, since the packing 34b attached under the hook portions 34a is in contact with the lower peripheral edge of the through hole 43 of the cushion member 27, air leaks from the press-fitting portion between the hook portions 34a and the through hole 43 is securely restricted.

As shown in FIG. 3, an air distribution channel 44 is defined on the top surface of the cushion member 27, that is, between the cushion member 27 and the placed pad 26. The air distribution channel 44 communicates with the through hole 43. The air distribution channel 44 is to distribute the conditioned air from the through hole 43 widely to a seating area (user contacting area) of the seat cushion 11. The air distribution channel 44 is diverged from the through hole 43 in the front and rear direction.

Further, the through holes 45, 46 communicating with the air distribution channel 44 are formed on the placed pad 26 and cover pad 25, respectively. The air blowoff holes 17, each having a diameter about 0.8 to 1.0 mm, are formed on the cover member 16 placed on the cover pad 25. Therefore, the conditioned air from the air distribution channel 44 is introduced to the rear side of the cover member 16 through the through holes 45, 46. Then, the air is blown off from the air blowoff holes 17 toward the user to cover the user's body.

The electric heater 22 is provided between the cover member 16 and cover pad 25. When the electric heater 22 is supplied with electric power, especially during heating in winter, the cover member 16 is directly heated with the electric heater 22. Also, the air distributed to the rear side of the cover member 16 is heated with the electric heater 22 so that the heated air is blown off toward the user's body.

Here, the cover member 16 is generally made of leather or fabrics. In the case that the cover member 16 is made of leather, the air blowoff holes 17 (e.g. about 0.8 to 1.0 mm in diameter) are formed on the cover member 16. In the case that the cover member 16 is made of fabrics, since the fabric is breathable through fibers, it is not required to form holes on the cover member 16. That is, the air blowoff holes 17 can be provided by spaces between the fibers. Here, the air passage 15 (in FIG. 15) includes the though hole 43, air distribution channel 44 and though holes 45, 46.

Next, a mounting structure of the second blower unit 14 onto the backrest 12 is described with reference to FIGS. 7 to 12. The second blower unit 14 is mounted in the backrest 12 in a similar manner to that of the first blower unit 13. Here, features of the second blower unit 14 are mainly described hereinafter. The second blower unit 14 has a blower case 51 having a rectangular shape. An axial flow-type blower fan 52, which blows air from the rear to the front, is rotatably installed in the blower case 51.

Figure 8:
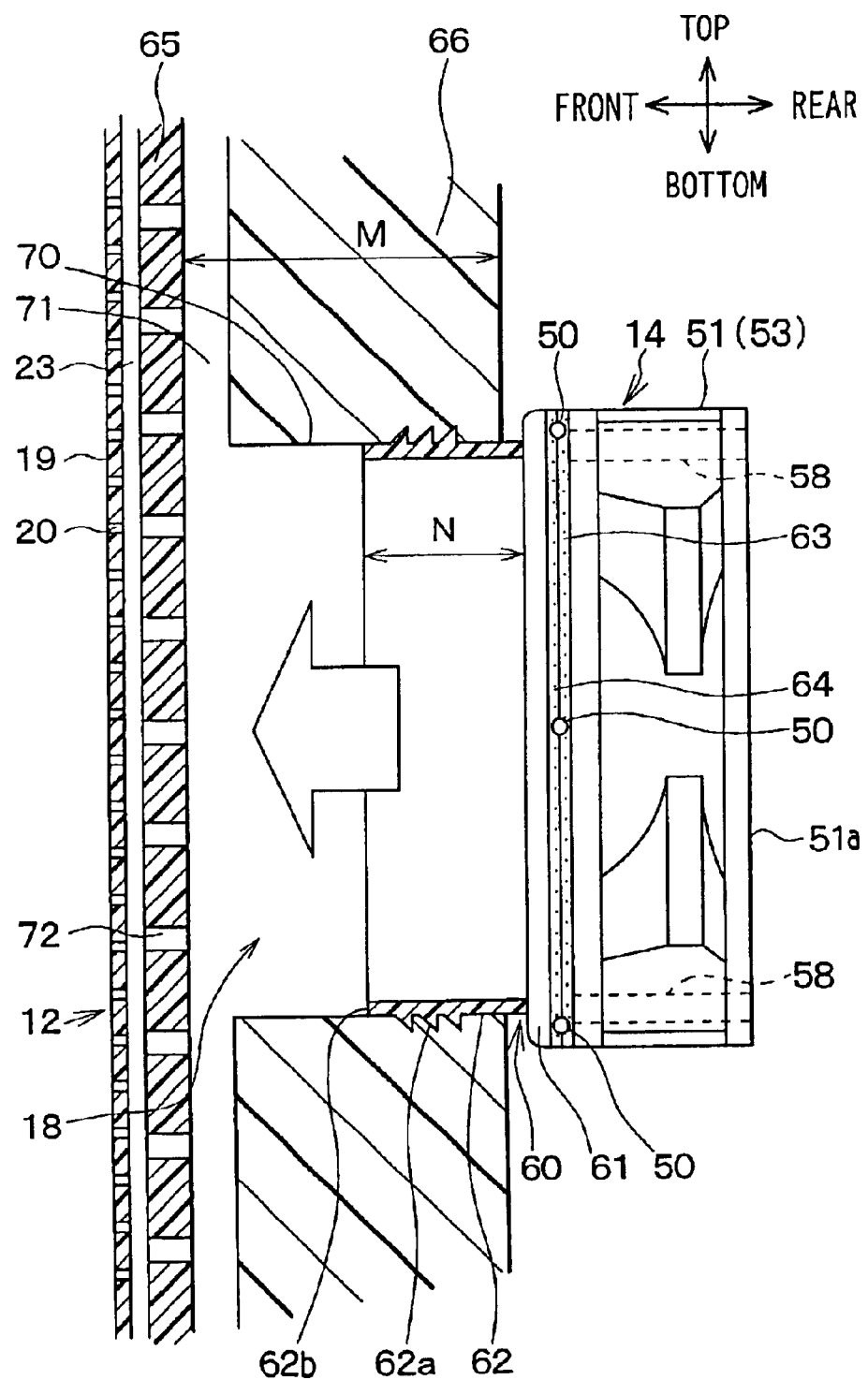
FIG. 8 is an enlarged cross-sectional view of the blower unit mounted on the backrest according to the first embodiment of the present invention.
Figure 9:
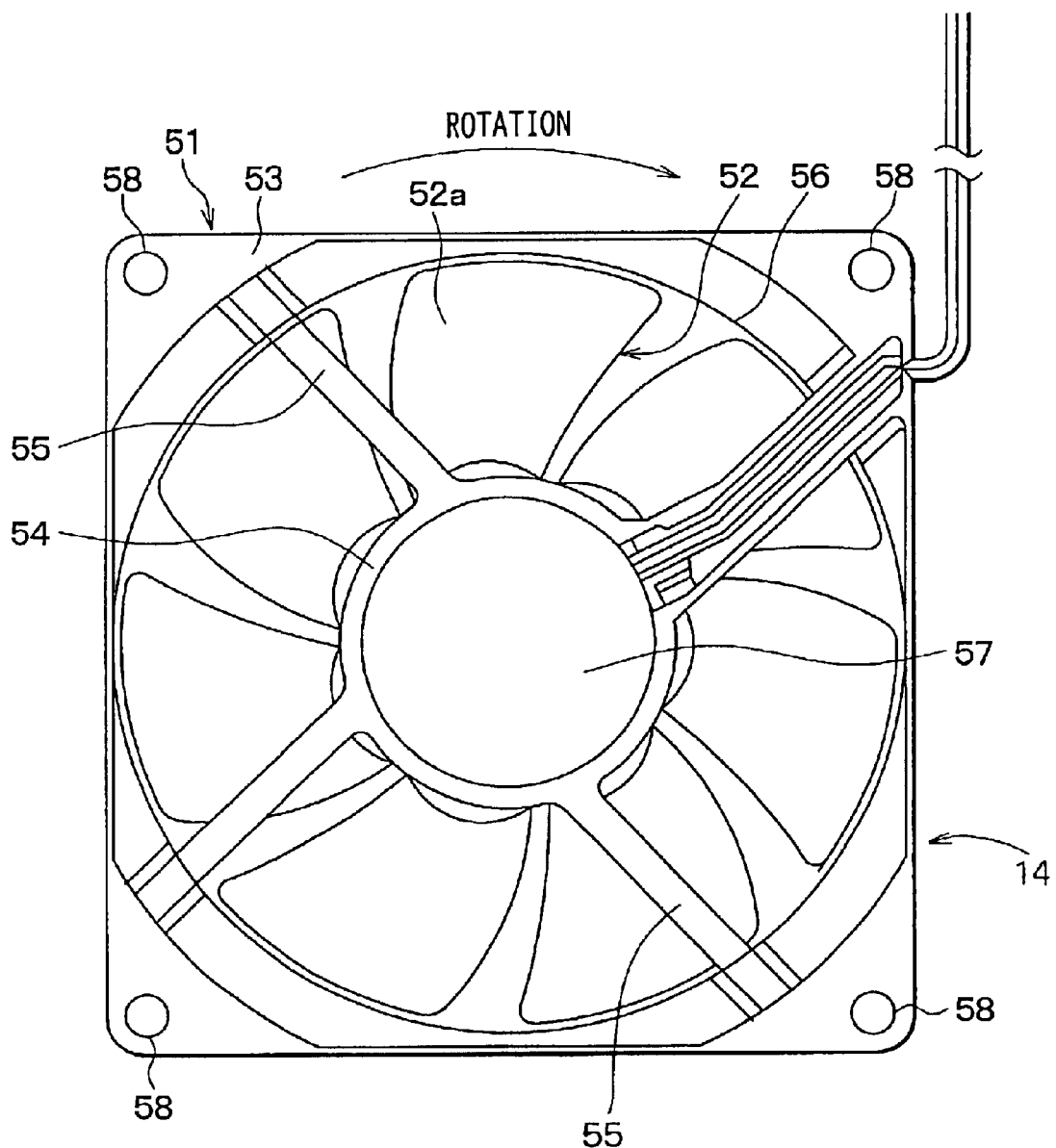
FIG. 9 is a front view of the blower unit mounted on the backrest according to the first embodiment of the present invention.

As shown in FIGS. 8 and 9, the blower case 51 includes a frame 53, a cylindrical motor support portion 54 formed in the middle of the frame 53, spoke portions 55 connecting the frame 53 and motor support portion 54, a cylindrical shroud 56 located at the outer periphery of blades 52a of the fan 52. The frame 53, motor support portion 54, spoke portions 55 and shroud 56 are integrally formed of resin. In FIG. 9, four spoke portions 54 are exemplary formed.

A drive motor 57 for the fan 52 is a brushless motor, and fitted in the cylindrical motor support portion 54. Fixing holes 58 are formed on the frame 53 at the corners.

Figure 10:
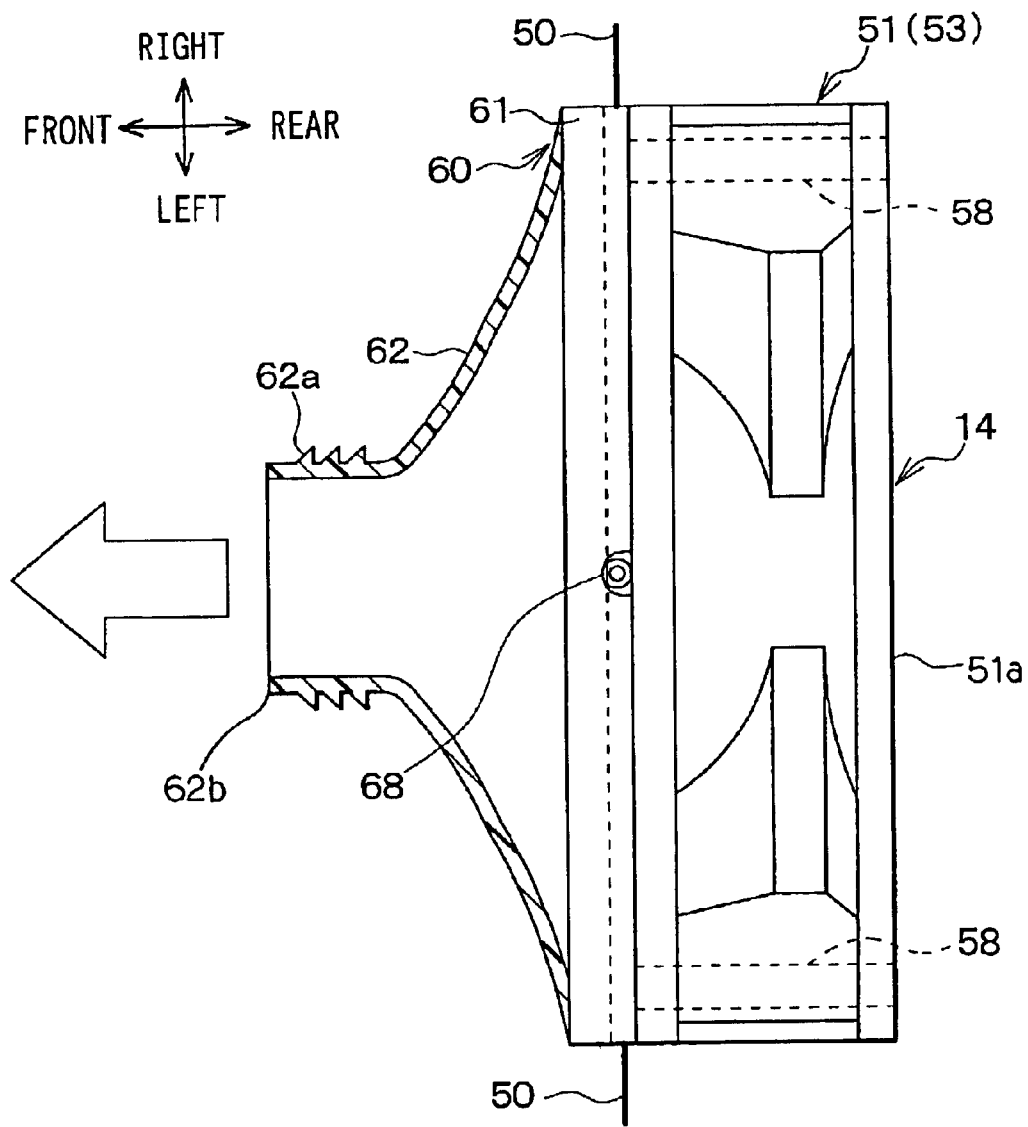
FIG. 10 is a top view of the blower unit mounted on the backrest, partially includes a cross-section, according to the first embodiment of the present invention.

A bracket 60 for mounting the second blower unit 14 onto wire seat springs 50 is made of resin such as polybutylene terephthalate. The bracket 60 corresponds to the bracket 37 of the first blower unit 13. As shown in FIGS. 8 and 10, the bracket 60 has a rectangular-shaped frame 61 to correspond to the rectangular-shaped frame 53. An inflow duct 62 for introducing the air into the seat 10 is integrally molded with the frame 61.

As shown in FIG. 8, a length of the front end 62b of the duct 62 in the top and bottom direction is substantially the same as that of the frame 61. However, the duct 62 is narrowed at one-fourth toward the front side in the right and left direction. That is, the front end 62b of the duct 62 has a rectangular-shaped cross-section elongated in the vertical direction. Hook portions 62a are integrally formed on the outer peripheral wall of the front end of the duct 62, similar to the hook portions 34a of the ducts 34 of the first blower unit 13. Here, in FIGS. 8 and 10, the inflow duct 62 is illustrated in cross-section.

As shown in FIG. 8, a flexible member 63 is attached to a surface of the frame 53, which is opposed to the frame 61 of the bracket 60. A flexible member 64 is attached to a surface of the frame 61 of the bracket 60, which is opposed to the frame 53. The flexible members 63, 64 are attached by adhesion and the like. The flexible members 63, 64 are made of similar materials to those of the flexible material 36, 38. Fixing holes (not shown) are formed on the frame 61 of the bracket 60 at the positions corresponding to the fixing holes 58 of the frame 53.

The backrest 12 has a cover pad 65 and cushion member 66 on the rear side of a cover member 19, as shown in FIG. 8. The cover pad 65 is made of resin similar to the cover pad 25 of the seat cushion 11. The cushion member 66 is made of elastic resin similar to the cushion member 27 of the seat cushion 11. Wire seat springs 50 are provided behind the cushion member 66. The seat springs 50 are extended in the right and left (horizontal) direction. The seat springs 50 are made of the spring rigid material and having circular-shaped cross-sections.

Figure 7:
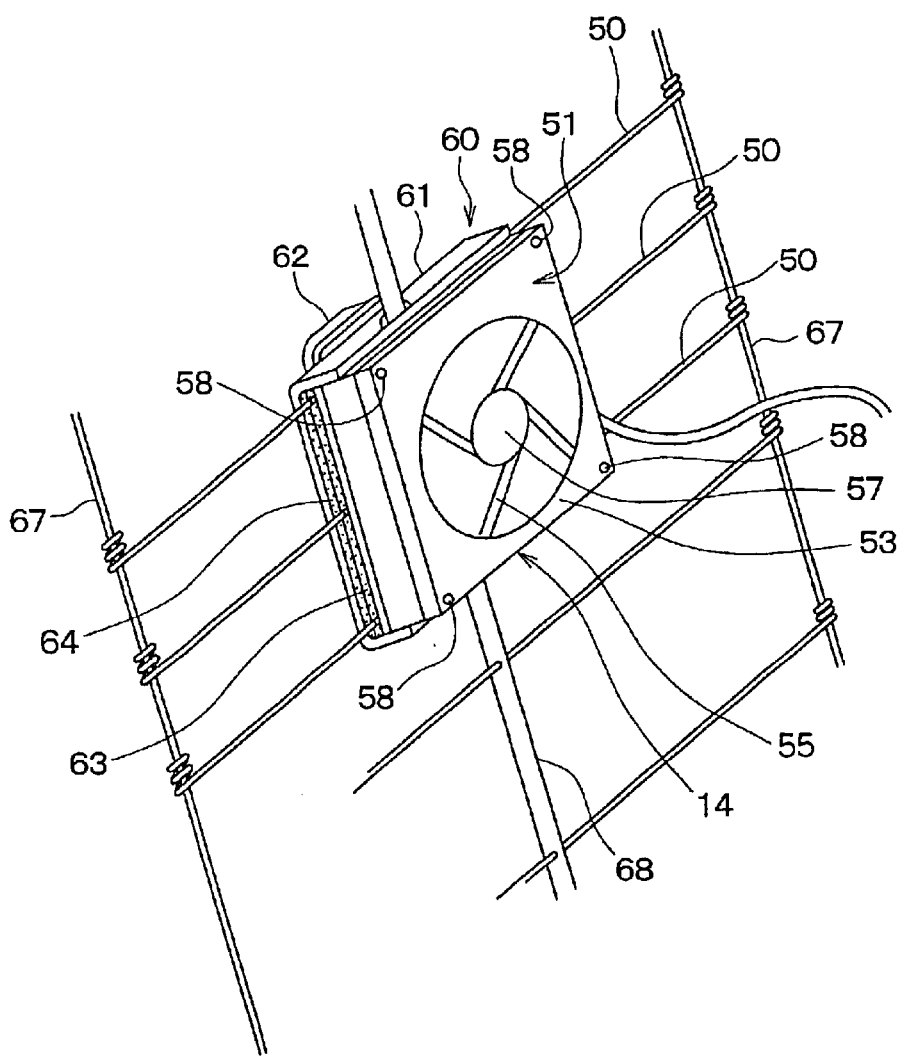
FIG. 7 is a schematic illustration explaining a mounting structure of the blower unit on a backrest according to the first embodiment of the present invention.

As shown in FIG. 7, ends of the seat springs 50 are connected to and supported by metallic backrest frames 67 extended in the top and bottom direction. Further, a metallic intermediate frame 68 is provided between the backrest frames 67 to extend in the top and bottom direction. The intermediate frame 68 is a pipe member and formed with through holes for passing through the seat springs 50 in the horizontal direction. Therefore, middle portions of the seat springs 50 are supported by the intermediate frame 68.

The top and bottom ends of the backrest frames 67 and intermediate frame 68 are connected to frame members (not shown) extending in the right and left direction. Therefore, the entire frame members including the backrest frames 67 and intermediate frame 68 are placed behind the cover member 19. The frame members functions as a seat reinforcement (frame) member for maintaining the shape of the backrest 12.

The seat springs 50 are placed behind the cushion member 66 and supported by the backrest frames 67, and intermediate frame 68. Therefore, even when the pressing pressure of the upper half of the user's body is applied onto the backrest 12, the cushion member 66 and the like are supported by the seat springs 50 to move with resiliency of the seat springs 50.

The second blower unit 14 is mounted as follows. The seat springs 50 are sandwiched between the flexible member 63 of the frame 53 and the flexible member 64 of the frame 61. In this embodiment, for example, three seat springs 50 extending in the right and left direction are sandwiched between the flexible members 63, 64, as shown in FIGS. 7 and 8. At this time, the intermediate frame 68 through which the seat springs 50 are inserted is also sandwiched between the flexible members 63, 64.

Then, screws are threaded into the fixing holes 58 formed at the corners of the frame 53 and the fixing holes of the frame 61, so that the blower case 51 is fastened to the bracket 60. Accordingly, the second blower unit 14 is supported to move in the front and rear direction with the seat springs 50. The flexible members 63, 64 absorb warping of the seat springs 50 and restrict the vibrations of the second blower unit 14. Also, the flexible members 63, 64 restrict air leaks.

Next, a communication structure between the inflow duct 62 and the air passage 18 in the backrest 12 is described with reference to FIG. 8. The cushion member 66 has a through hole 70 penetrating in the front and rear direction. The through hole 70 is located in the substantially middle portion of the cushion member 66 in the top and bottom direction.

The front end of the inflow duct 62, which has the hook portions 62a on the outer periphery, is press-fit in the through hole 70. With this, air leaks is suppressed between the through hoe 70 and the duct 62. Also, since the duct 62 has the hook portions 62a, the duct 62 is securely fixed to the cushion member 66. Here, similar to the packing 34b of the inflow duct 34, a packing for sealing can be attached on the outer periphery of the duct 62, so that air leaks between the duct 62 and the through hole 70 can be prevented.

The inflow duct 62 protrudes at a length N (e.g. about 10 to 15 mm) from the frame 61 to the front. The cushion member 66 has a thickness M, for example, about 40 mm. Since the thickness M of the cushion member 66 is greater than the protruded length N of the duct 62, a seating comfort of the backrest 12 is not deteriorated due to the duct 62.

An air distribution channel 71 is defined between the cover pad 65 and the cushion member 66. The air distribution channel 71 communicates with the through hole 70. The air distribution channel 71 is to distribute the air from the through hole 70 to the wide area in the backrest 12. The air distribution channel 71 is diverged to the top and bottom from the through hole 70.

Through holes 72 are formed on the cover pad 65, which is located in front of the cushion member 66, in an area corresponding to the air distribution channel 71. The through holes 72 communicate with the air distribution channel 71. The air blowoff holes 20 are formed on the cover member 19, which is located in front of the cover pad 65. The air blowoff holes 20 are about 0.8 to 1.0 mm in diameter. Therefore, the conditioned air in the air distribution channel 71 passes through the through holes 72 and reach behind the cover member 19. The conditioned air is further blown off from the air blowoff hole 20 toward the user to cover the user's body.

The electric heater 23 is provided between the cover member 19 and the cover pad 65. When the electric heater 23 is supplied with the electric power, especially during heating in the winter, the cover member 19 can be directly heated with the electric heater 23. Also, the conditioned air reached behind the cover member 19 can be heated with the electric heater 23 and blown off toward the user's body.

Similar to the cover member 16, the cover member 19 is made of leather or fabrics. In the case that the cover member 19 is made of the leather, the air blowoff holes 20 are formed on the cover member 19. However, in the case that the cover member 19 is made of fabrics, it is not required to form the air blowoff holes 20 because the fabric has spaces between the fibers. The air passage 18 (in FIG. 1) includes the through hole 70, air distribution channel 71 and through holes 72.

Next, an air passage structure on an air intake side of the second blower unit 14 is described with reference to FIG. 11. A space 74 is defined between a rear cover member 19' and a curved back board 73, on the rear side of the backrest 12. An air inlet side end 51a of the blower case 51 (right side end of the case 51 in FIGS. 8 and 10) communicates with the space 74. An opening (air inlet) 75 is formed at the lower portion of the backrest 12, so that the space 74 communicates with the passenger compartment through the air inlet 75.

When the blower fan 52 is driven with the drive motor 57, the air in the passenger compartment is sucked into the space 74 from the air inlet 75 as shown by an arrow F1. The air is further drawn into the blower case 51. Then, the air is blown toward the inflow duct 62, and introduced into the air distribution channel 71 through the through hole 70. Further, the air is blown off from the air blowoff holes 20 through the through holes 72 of the cover pad 65.

An adjusting rod 76 of a lumbar support adjuster is provided in the space 74.

Next, effects and advantages of the first embodiment are described.

(1) The first and second blower units 13, 14 are directly mounted on the seat springs 28, 50 supporting the cushion members 27, 66. Therefore, the seat springs 28, 50 are used as the fixing means for fixing the first and second blower units 13, 14 in the seat 10. Accordingly, the first and second blower units 13, 14 are installed in the seat 10 with a simple structure. Further, spaces for fixing the blower units 13, 14 can be reduced.

(2) The first and second blower units 13, 14 are supported by the seat springs 28, 50 to move with the seat springs 28, 50. Also, the blower cases 30, 51 of the first and second blower units 13, 14 are provided on a side opposite to the cushion members 27, 66 with respect to the seat springs 28, 50, respectively. That is, the cushion members 27, 66, seat springs 28, 50, and first and second blower units 13, 14 are sequentially arranged on the rear side of the cover members 16, 19 that makes contact with the user.

Therefore, the first and second blower units 13, 14 can be fastened to the cushion members 27, 66 and seat springs 28, 50 by the simple structure. Further, shock can be absorbed by elastic expansion and contraction of the cushion members 27, 66. Also, the shock absorbing performance of the cushion members 27, 66 is not deteriorated by the installations of the blower units 13, 14.

That is, even when the blower units 13, 14 are installed inside the seat 10, the seating comfort can be maintained. Further, shock due to user's weight is not applied to the blower units 13, 14, thereby decreasing damage to the blower units 13, 14.

Figure 12:
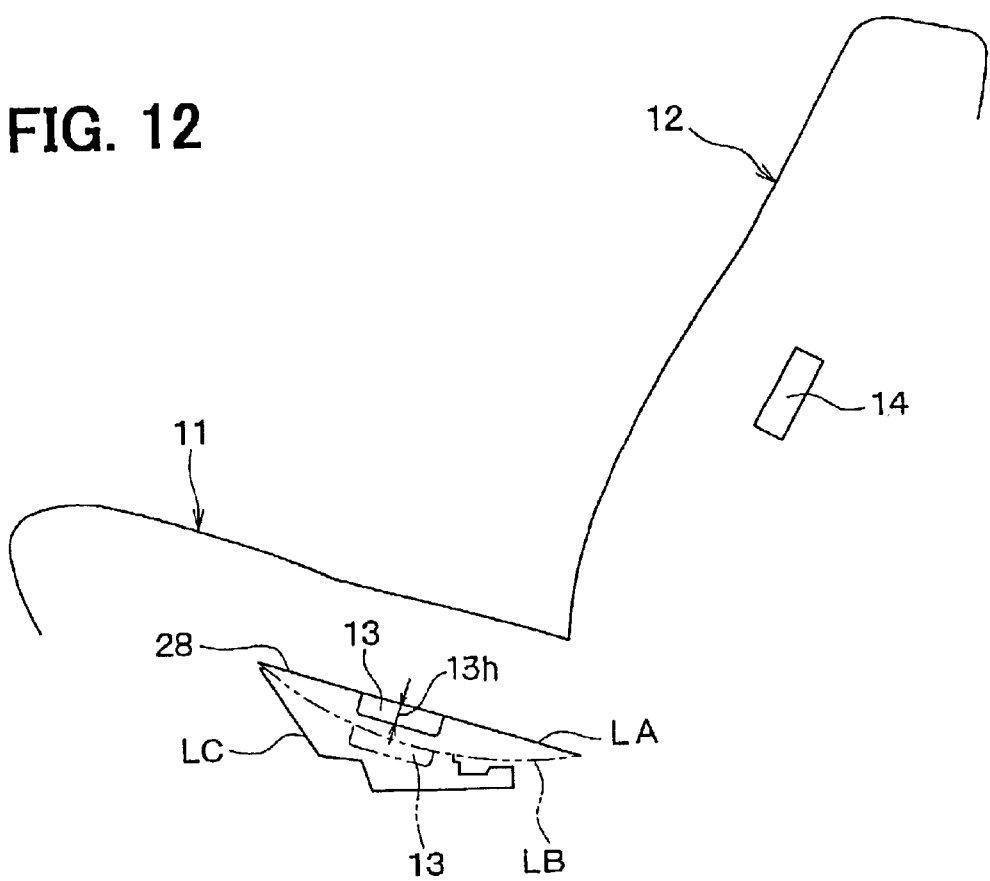
FIG. 12 is a schematic illustration of the vehicle seat illustrating a seat spring according to the first embodiment of the present invention.

Referring to FIG. 12, a solid line LA illustrates a stationary position of the seat springs 28, which extends in the seat cushion 11 in the front and rear direction. The stationary position is the position when the seating pressure is not applied onto the seat cushion 11. The chain double-dashed line LB illustrates a bent position of the seat springs 28 when a passenger having a weight of about 120 kg is seated on the seat cushion 11, that is, when the seat springs 28 are bent maximum. A solid line LC illustrates a top surface line of an obstacle on the vehicle floor.

Because the blower units 13 is formed into a flat shape having a thickness 13h of about 25 mm, the blower unit 13 is supported above the top surface line LC of the obstacle when the seat springs 28 are bent maximum as shown in the line LB. Therefore, the first blower unit 13 is protected.

(3) The first and second blower units 13, 14 are mounted such that the seat springs 28, 50 are sandwiched between the flexible members 36 and 38, and 63 and 60, respectively. Therefore, the bending or warping of the seat springs 28, 50 are absorbed with the flexible deformation of the flexible members 38, 64. With this, the bending or warping of the seat springs 28, 50 are not directly transmitted toward the blower cases 30, 51. Accordingly, vibrations of the blower units 13, 14 due to the bent of the seat springs 28, 50 can be decreased.

(4) As shown by the chain double-dashed line LB, the seat springs 28 are largely bent when the heavy passenger seats on the seat cushion 11. If the blower unit 13 is connected to the seat springs 28 in a state that the movement of the seat springs 28 are restricted at the connecting portions, stress due to the bending of the seat springs 28 is applied to the fixing bracket 37 (FIG. 5) and the blower case 30. This may cause breakage of the first blower units 13.

In the present embodiment, however, when the seating pressure is applied by the user, the seat springs 28 extending in the front and rear direction bend downwardly while displacing in the right and left direction. The second hook portions 37e of the bracket 37 are made by bending in the right and left direction after bent in the top direction from the right and left edges of the first and second bridges 37a, 37b.

Therefore, when the seat springs 28 are moved downwardly with the seating pressure of the passenger, the seat springs 28 are allowed to move in the right and left direction as shown by the arrow E1 in FIG. 6, separately from the bracket 37. Accordingly, it is restricted that, the stress due to the bent of the seat springs 28 is directly applied to the bracket 37 and the blower case 30, thereby decreasing breakage of the first blower unit 13.

(5) With the operation of the first and second blower units 13, 14, the conditioned air in the passenger compartment is introduced toward the blowoff holes 17, 20 on the cover member 16, 19, and is blown off from the blowoff holes 17, 20 to surround the user's body. Therefore, the user can obtain comfortable air-conditioning feeling. During heating, especially in the winter, the cover member 16, 19 are directly heated with the electric heaters 22, 23. Further, the air heated by the electric heater 22, 23 can be blown off, thereby providing the comfortable air-conditioning feelings to the user.

(6) The air distribution channels 44, 71 are formed between the cushion members 27, 66 and placed pads 26, 65, respectively, behind the cover members 16, 19. Therefore, partial deformation of the cover members 16, 19 due to the through holes 43, 70 can be decreased. Further, discomfort due to the partial deformation of the cover members 16, 19 can be decreased.

[Second Embodiment]

Figure 13:
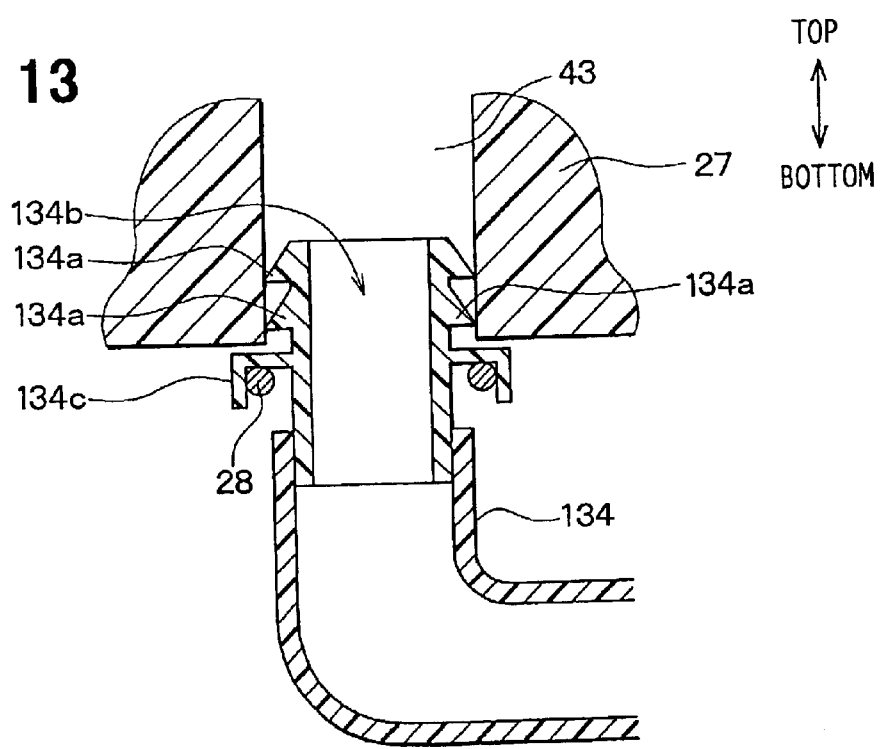
FIG. 13 is a partial cross-sectional view of an inlet duct of a blower unit of a seat cushion, according to the second embodiment of the present invention.

In the first embodiment, the inflow duct 34 having the hook projections 34a is integrally formed with the blower case 30 of the first lower unit 13. In the second embodiment, a cylindrical member 134b having hook projections 134a on the outer periphery is formed separately from the inflow duct 134, as shown in FIG. 13. Preferably, the cylindrical member 134b is formed of resin. The cylindrical member 134b is engaged with the inflow duct 134 to be movable in the axis direction (top and bottom direction).

As shown in FIG. 13, the end (lower end in FIG. 3) of the cylindrical member 134b is movably fit in the inner periphery of the top end of the inflow duct 134. The opposite end (upper end in FIG. 3) of the cylindrical member 134b having the hook projections 134a is press-fit in the through hole 43 of the cushion member 27. Since the hook projections 134a are formed on the outer periphery of the cylindrical member 134b, the cylindrical member 134b is securely fixed to the cushion member 27.

A support plate portion 134c is integrally formed with the cylindrical member 134b. The support plate portion 134c projects radially outward from the outer peripheral surface of the cylindrical member 134b. The seat springs 28 are located under the support plate potion 134c. Therefore, the cylindrical member 134b can be supported with the cushion member 27 to be movable with the resilient movement of the seat springs 28. Accordingly, the cylindrical member 134b can move downwardly with the cushion member 27 in accordance to the seating pressure, separately from the inflow duct 134.

As a result, discomfort due to the cylindrical member 134b having the hook projections 134a can be decreased, thereby improving the seating comfort. Here, springs (resilient means) specific to the cylindrical member 134b can be used, in place of the seat springs 28.

The first embodiment can be modified as follows.

In the first embodiment, the first and second blower units 13, 14 draw the air in the passenger compartment and blow it into the air passages 15, 18. However, the air inlet portions of the first and second blower units 13, 14 can be communicated with a conditioned air outlet of the air-conditioning unit 21 through connecting ducts. In this case, the air (cooled air, heated air) conditioned in the air-conditioning unit 21 can be drawn into the first and second blower units 13, 14 and introduced into the air passages 15, 18 in the seat 10.

In the first embodiment, the fitting seatings 35 are integrally formed on the top of the blower case 30, as shown in FIG. 4. Since the bracket 32c of the drive motor 32 is provided adjacent to the fitting seating 35, the fitting seatings 35 can be integrally formed with the bracket 32c.

Figure 11:
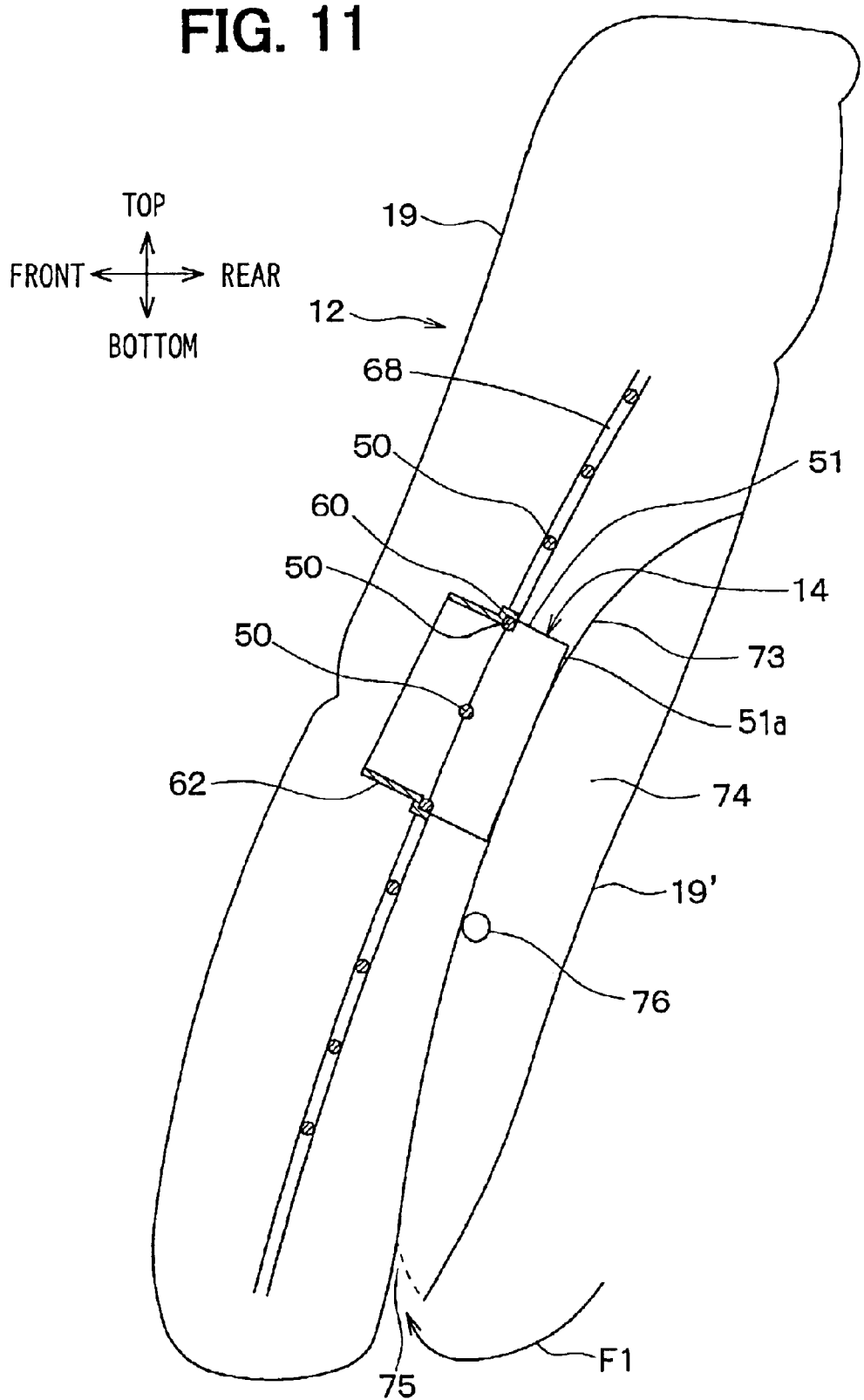
FIG. 11 is a schematic illustration explaining an air inlet side passage of the blower unit mounted on the backrest according to the first embodiment of the present invention.

In the first embodiment, the air inlet 75 is formed under the space 74 to draw the air into the second blower unit 14 in the backrest 12, and the air in the passenger compartment is drawn from the air inlet 75, as shown in FIG. 11. However, the air inlet 75 having a grill can be formed at the proximity of the second blower unit 14 behind the backboard 73 so that the air in the passenger compartment can be directly drawn into the second blower unit 14 from the air inlet 75.

In the above embodiments, the first and second blower units 13, 14 are mounted on the seat springs 28, 50, respectively. However, specific springs can be provided in the seat 10 as the resilient means for the blower units 13, 14. The specific springs are supported with the seat reinforcement member, such as the seat cushion frame 29 in FIG. 4, and the backrest frame 67, and intermediate frame 68 in FIG. 7. The first and second blower units 13, 14 are mounted on the specific springs. In this case, because the specific springs are indirectly jointed to the seat springs 28, 50, the first and second blower units 13, 14 are mounted indirectly on the seat springs 28, 50.

The present invention should not be limited to the disclosed embodiments, but may be implemented in other ways without departing from the spirit of the invention.

What is claimed is:

1. An air-conditioning unit for a vehicle seat that includes a cover member having a front surface to be in contact with a user, a rear surface opposite to the front surface and a cushion member provided adjacent to the rear surface of the cover member, the air-conditioning unit comprising:
   a seat spring in a form of wire provided on a side opposite to the cover member with respect to the cushion member for resiliently supporting the cushion member; and
   a blower unit for blowing air to the user through the cover member, wherein the blower unit includes:
      a blower fan for creating a flow of air;
      a blower case in which the blower fan is rotatably supported;
      a first fixing member integrally formed with the blower case; and
      a second fixing member fastened to the first fixing member in a condition that the seat spring is interposed between the first fixing member and the second fixing member so that the blower case is supported by the seat spring to translate with the seat spring on a side opposite to the cushion member with respect to the seat spring.

2. The air-conditioning unit according to claim 1, wherein the cushion member is spaced from the cover member and defines an air channel between the cover member and the cushion member, and the blower unit includes a duct for introducing air blown by the blower fan into the air channel.

3. The air-conditioning unit according to claim 2, wherein the cover member defines holes through which air introduced in the air channel is blown toward the user.

4. The air-conditioning unit according to claim 1, wherein the cushion member is spaced from the cover member and defines an air channel between the cushion member and the cover member, and the second fixing member is formed with a duct for introducing air blown by the blower fan into the air channel.

5. The air-conditioning unit according to claim 1, wherein the blower unit includes a flexible member, wherein the flexible member is provided to surround the resilient member between the first fixing member and the second fixing member.

6. The air-conditioning unit according to claim 1, wherein the second fixing member forms a first hook portion in which the seat spring resides in such a manner that restricts displacement and also forms a second hook portion in which the seat spring resides in such a manner that allows displacement.

7. The air-conditioning unit according to claim 6, wherein:
   the seat spring is in a form of a square wave with rounded corners,
   the seat spring includes a first straight portion and a second straight portion, the second straight portion being perpendicular to the first straight portion,
   the first straight portion resides in the first hook portion in such a manner that allows displacement in a longitudinal direction of the first straight portion, and
   the second straight portion resides in the second hook portion in such a manner that allows displacement in a direction substantially perpendicular to a longitudinal direction of the second straight portion.

8. The air-conditioning unit according to claim 1, further comprising:
   an electric heater provided adjacent to the rear surface of the cover member.

9. The air-conditioning unit according to claim 1, wherein the blower unit is mounted in a seat bottom of the seat.

10. The air-conditioning unit according to claim 1, wherein the blower unit is mounted in a seat back of the seat.

11. The air-conditioning unit according to claim 1, further comprising:
a seat reinforcement member for maintaining a seat shape, wherein the seat spring is connected to the seat reinforcement member.

12. A seat air-conditioning unit comprising:
a seat defining an air passage, the seat further including,
a cover member having an outside surface to be in contact with a user and an inside surface opposite to the outside surface;
a cushion member provided adjacent to the inside surface of the cover member, the cushion member having a first surface opposing the inside surface of the cover member and a second surface opposite to the first surface;
a wire spring provided adjacent to the second surface of the cushion member; and
a blower unit for blowing air into the air passage, the blower unit having a blower case and a fixing bracket, wherein:
the fixing bracket is fastened to the blower case through the wire spring such that the blower case hangs from the wire spring on a side opposite to the cushion member with respect to the wire spring and the wire spring is allowed to move between an open space defined between the fixing bracket and the blower case when a load is applied on the seat.

13. The air-conditioning unit according to claim 12, wherein the fixing bracket is in a form of a plate and is fastened to the blower case in parallel to the spring wire.

14. The air-conditioning unit according to claim 13, wherein the fixing bracket forms hook portions and the spring wire is held in the hook portions.

15. The seat air-conditioning unit according to claim 12, wherein the blower unit has a flexible member at a contact portion between the blower case and the fixing bracket so that the wire spring is sandwiched between the fixing bracket and the blower case through the flexible member.

16. The seat air-conditioning unit according to claim 12, wherein the seat includes a seat reinforcement member for maintaining a seat shape, wherein the wire spring extends along the second surface of the cushion member and connects to the seat reinforcement member.

17. The seat air-conditioning unit according to claim 12, wherein the cushion member is spaced from the cover member for defining an air channel and the cushion member has a through hole communicating with the air channel, wherein the blower unit is partially connected in the through hole so that air is blown into the air channel and toward the user through the cover member.

18. The air-conditioning unit according to claim 1, wherein:
the seat spring is in a form of a square wave with rounded corners, and
the second fixing member forms hook portions in which straight portions of the seat spring reside in such a manner that allows displacement in a longitudinal direction and in a direction substantially perpendicular to a longitudinal direction of the straight portions.

19. The air-conditioning unit according to claim 18, wherein the second fixing member is in a form of plate having a U-shape.

20. The air-conditioning unit according to claim 18, wherein the second fixing member is in a form of a plate and is fastened to the first fixing member in parallel to the blower case.

21. The air-conditioning unit according to claim 7, wherein the second fixing member is a plate having a U-shape and is layered on the first fixing member.

* * * * *